United States Patent [19]

Yokoi et al.

[11] 3,959,444

[45] May 25, 1976

[54] MAGNESIUM ALUMINOSILICATE AND PROCESS FOR THE MANUFACTURE THEREOF

[75] Inventors: Hideharu Yokoi; Tetuo Haginaka, both of Toyama; Mitiji Inagaki, Namerikawa, all of Japan

[73] Assignee: Fuji Chemical Industry Co., Ltd., Japan

[22] Filed: Feb. 27, 1973

[21] Appl. No.: 336,207

[30] Foreign Application Priority Data

May 22, 1972  Japan.............................. 47-50506

[52] U.S. Cl............................ 423/328; 423/329; 424/154
[51] Int. Cl.$^2$.................... C01B 33/22; C01B 33/26
[58] Field of Search............ 423/328, 329, 330, 327, 423/331; 424/154, 155

[56] References Cited
UNITED STATES PATENTS

| 2,970,889 | 2/1961 | Ishino et al. | 423/330 |
| 3,032,394 | 5/1962 | Ishino et al. | 423/330 |
| 3,476,692 | 11/1969 | Hoffman | 424/155 X |
| 3,523,764 | 8/1970 | Uoda et al. | 423/330 |

FOREIGN PATENTS OR APPLICATIONS

| 48-13509 | 2/1973 | Japan | 423/328 |
| 1,154,799 | 6/1969 | United Kingdom | 423/328 |
| 1,079,435 | 8/1967 | United Kingdom | 423/328 |

*Primary Examiner*—Edward J. Meros
*Attorney, Agent, or Firm*—Armstrong, Nikaido & Wegner

[57] ABSTRACT

Magnesium aluminosilicate, silicic acid of which is not absorbed through digestive tracts on administration, can be produced by reacting polymeric sodium silicate having a siloxane structure of a polymerization degree of $10^2$ to $10^4$ with sodium aluminate in an atomic ratio of Al to Si of 1 – 2 : 1 and then reacting the reaction mixture with a water soluble magnesium salt in an atomic ratio of Mg to Al of 0.5 – 1 : 1.

7 Claims, No Drawings

MAGNESIUM ALUMINOSILICATE AND PROCESS FOR THE MANUFACTURE THEREOF

This invention relates to magnesium aluminosilicate and a process for the manufacture thereof. More particularly, this invention relates to a novel magnesium aluminosilicate as an antacid agent which is characterized by siloxane structure of a polymerization degree of $10^2$ to $10^4$ and silicic acid of which may not be absorbed through digestive tracts on administration and a novel process for the manufacture thereof.

Magnesium aluminosilicate has long been widely used for antacid purpose in treating hyperacidity and gastric ulcer. Antacids are required to have a large acid neutralizing capacity, to act promptly, and to have a sustained effect, but not to induce and accompanying rebound acid secretion, which is reactionarily promoted acid secretion resulting from excessive neutralization of the gastric contents with the administered antacid. Magnesium aluminosilicate shows excellent antacid properties to meet the above-mentioned requirements. Also, silicic acid compounds such as magnesium trisilicate ($2MgO.3SiO_2 \cdot xH_2O$) and synthetic aluminum silicate ($Al_2O_3 \cdot 10SiO_2 \cdot xH_2O$) are used for the respective purposes.

Silicon dioxide, which is a constituent element of these compounds, is indispensable for the human body, and particularly for the growth of bones. However, if an amount of the absorbed compounds exceeds a certain amount, they are considered to be harmful in some cases and to cause, for example, arteriosclerosis. Also, it has been reported that silicon may form calculi like cholesterol or phospholipid. It is still not clear whether or not these troubles are caused by silicon dioxide. The absorption mechanism of silicic acid in silicates is estimated as follows:

$$MeO.xSiO_2.nH_2O + 2HCl \rightarrow MeCl_2 + xSiO_2 + (n+1)H_2O$$

wherein Me is a bivalent alkaline earth metal atom. After administration, the silicate is decomposed by gastric juice into the alkaline earth metal chloride and colloidal silicic acid. The mixture is then led to the small intestines, where it is converted by alkaline intestinal juice into soluble sodium silicate which can be absorbed.

$$xSiO_2 + 2NaHCO_3 \rightarrow xSiO_2.Na_2O + 2CO_2 + H_2O$$

Here, if the salts formed as a by-product and the unreacted silicate are basic, body fluid is in the state of alkalosis and the colliodal silicic acid is apt to become soluble and absorbable.

$$MeO.xSiO_2.nH_2O + HCl \rightarrow \tfrac{1}{2}MeCl_2 + x/2SiO_2 + \tfrac{1}{2}MeO.xSiO_2.nH_2O + \tfrac{1}{2}(n+1)H_2O$$

$$xSiO_2 + 2NaHCO_3 + MeO.xSiO_2.nH_2O \rightarrow xSiO_2.Na_2O + 2CO_2 + MeO.xSiO_2.nH_2O + H_2O$$

Magnesium aluminosilicate which may be used as an antacid has a molar ratio of MgO to $Al_2O_3$ of 1.0 – 2.0 : 1 and a molar ratio of $SiO_2$ to $Al_2O_3$ of 2.0 – 1.0 : 1. This composition shows the immediate effect of magnesium together with the lasting effect of aluminum and offsets the respective defects of magnesium and aluminum atoms such as diarrhoic activity and constipating activity. Further, silicic acid makes the structure of the compound amorphous, improves the adsorbing power of the compound, shows gastric mucosa protective coating action, and prevents the change of the compound with the lapse of time as found in compounds of $Al_2O_3 - MgO$ system or co-precipitated compounds thereof. Among these components, silicon is particularly important. If a silicic acid compound, silicic acid of which as an indispensable constituent element is not absorbed, can be produced, the product thus obtained will not only obviate the possible defects mentioned above but also be a very effective and safe antacid for medical treatment.

Prior art processes for the manufacture of magnesium aluminosilicate for medical uses are disclosed in Japanese Patent Publication No. 618/59 (Japanese Patent No. 252,030) corresponding to U.S. Patent specification No. 2,970,889, U.K. Patent specification No. 834,934 and West German Patent specification No. 1,061,754, Japanese Patent Publication No. 514/59 (Japanese Patent No. 252,032), (Japanese Patent Publication No. 23,163/61 (Japanese Patent No. 296,410) corresponding to U.S. Patent specification No. 3,032,394 and Japanese Patent Publication No. 7,719/67 (Japanese Patent No. 501,644). Magnesium aluminosilicate produced by these known techniques has a monomeric siloxane structure or a siloxane structure of a polymerization degree of about 2 – 10. It corresponds to the polymerization degree of silicic acid in sodium silicate used as the starting material.

As a result of extensive studies on the production of magnesium aluminosilicate whose silicic acid is not absorbed, the present inventors have now found that magnesium aluminosilicate, whose respective elements are firmly bonded with one another and whose siloxane chain is still not decomposed by gastric and intestinal juices even after the aluminum and magnesium portions have been decomposed by gastric juice and whose silicic acid is not absorbed through digestive tracts, can be produced by using a polymeric alkali silicate produced by the partial neutralization of the alkali silicate as a silicic acid source. The present invention has been completed on the basis of this finding.

In other words, this invention relates to magnesium aluminosilicate having a siloxane structure of a polymerization degree of $10^2$ to $10^4$, and preferably of $4.5 - 5.0 \times 10^3$, and a process for the manufacture thereof. In the magnesium aluminosilicate obtained according to this invention, the siloxane chain is not decomposed by a digestive fluid and the silicic acid is not absorbed.

According to this invention, a mineral acid such as sulfuric acid or hydrochloric acid is added to an aqueous solution of sodium silicate having a molar ratio of $SiO_2$ to $Na_2O$ of 1.0 – 3.3 : 1 at a temperarture of 20° – 80°C, and preferably 40° – 50°C, to partially neutralize the sodium silicate up to a molar ratio of $SiO_2$ to $Na_2O$ of 8 – 20 : 1. In this way, polymeric sodium silicate having a siloxane structure of a silicic acid polymerization degree of $10^2$ to $10^4$ is produced. At this time, the presence of a neutral salt such as sodium sulfate or sodium chloride, and particularly a 1 – 3% aqueous solution thereof, permits the production of polymeric sodium silicate having a uniform polymerization degree.

The thus obtained polymeric sodium silicate is used as a silicic acid source, to which is added an alkali aluminate, for example, sodium aluminate (a molar ratio of $Na_2O$ to $Al_2O_3$ 1.5 – 3.0 : 1) in a molar ratio of $SiO_2$ to $Al_2O_3$ of 1.0 – 2.0 : 1. Thereby, the sodium aluminate is bonded with polymeric sodium silicate by the lattice siloxane structure as a frame to produce sodium aluminosilicate, (1.0 - 2.0) $SiO_2.Al_2O_3.(2.0 - 1.0)Na_2O$. Here, part of sodium hydroxide is isolated according to an amount of aluminate ion bonded. Further, an amount of a water soluble magnesium salt, for example, magnesium chloride corresponding to the alkali amount of the sodium aluminosilicate is added in a molar ratio of MgO to $Al_2O_3$ of 1.0 - 2.0 : 1 to effect double decomposition. Thus, the desired magnesium aluminosilicate is obtained.

The essential feature of the present invention resides in the polymerization form of the siloxane structure of the sodium silicate used as a silicic acid source. In case of magnesium aluminosilicate produced by using sodium silicate having the polymerization degree of siloxane chain of $10^2$ or less, that is, a molar ratio of $SiO_2$ to $Na_2O$ of 8 : 1 or less, the silicic acid produced by the decomposition by gastric juice becomes colloidal and is easily solubilized by intestinal juice. For example, in case of magnesium aluminosilicate synthesized from a lower grade polymeric sodium silicate having a molar ratio of $SiO_2$ to $Na_2O$ of 3.3 : 1 and the polymerization degree of siloxane of 5 - 6 as disclosed in Japanese Patent Publication No. 23,163/61. (Japanese Patent No. 296,410), 60 - 100% of the silicic acid content is decomposed by gastric and intestinal juices and converted into water soluble sodium silicate. Also, if the polymerization degree of the silicic acid is $10^4$ or more (Japanese Patent Application 48996/71, published as Japanese Published Application No. 13509/73, on Feb. 20, 1973, the bond of silicon with aluminum or magnesium through oxygen becomes weak, free magnesium aluminate is partly produced, and the advantages of the three-component system with regard to, for example, the change of antacid activity with the lapse of time are lost.

In order to study the absorbed and excreted amounts of the magnesium aluminosilicate produced by the present invention, an amount of silicic acid contained in the urine and blood of the animals tested was determined after the oral administration of the product of Example 1 as described below. The animals used in this test were 6 - 7 month-old beagle dogs weighing 8 - 10 kg. The sample was given twice a day. An amount corresponding to 0.5 g of $SiO_2$/kg/day of the sample was diluted with water to 80 ml and administered by oral intubation. The administration was continued for one week. On the seventh day after the administration commenced, an amount of silicic acid contained in the urine and blood of the animals was determined the results of which are shown in Table 1. The determination of silicic acid was made by decomposing the collected urine and blood with concentrated hydrochloric acid, heating to dryness, washing and treating with hydrofluoric acid. The determination of the polymerization degree of silicic acid in magnesium aluminosilicate was made by decomposing the sample with hexamethyldisiloxane and hydrochloric acid and analyzing the resulting trimethylpolysilicate by gas chromatography and elementary analyses. The results obtained are shown in the following table.

Table 1

| | 2SiO$_2$.Al$_2$O$_3$.MgO.xH$_2$O | | Beagle Dogs | |
|---|---|---|---|---|
| | Starting sodium silicate, molar ratio of SiO$_2$/Na$_2$O | Polymerization degree of silicic acid in magnesium aluminosilicate | Amount of silica in urine (mg/day) | Amount of silica in blood (ppm) |
| Control | 1.0 | 1.2 | 362.0 | 48.5 |
| Control (Japanese Patent Publication No. 23,163/61) | 3.3 | 5.9 | 138.7 | 27.4 |
| Control | 5.2 | 16.3 | 93.3 | 23.9 |
| Control | 8.0 | 94 | 61.5 | 22.2 |
| Example 1 of this invention | 11.9 | 4700 | 42.8 | 17.0 |
| Control | 22 | 10$^4$< | 39.4 | 16.3 |
| Control | 50 | 10$^4$< | 45.7 | 18.1 |

According to Charles W. Lentz's method [C. W. Lentz, "Inorganic Chemistry", Vol. 3, page 574 (1964)], the structure of magnesium aluminosilicate was analyzed as follows:

Hexamethyldisiloxane, isopropyl alcohol and hydrochloric acid were mixed and the mixture was stirred for 1 hour while the temperature was adjusted to 18° - 20°C. Powder of magnesium aluminosilicate was added thereto in the form of a slurry of the powder and water. The resulting mixture was stirred at room temperature for about two hours to react well. In this case, hexamethyldisiloxane reacted as follows:

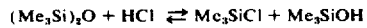

$(Me_3Si)_2O + HCl \rightleftarrows Me_3SiCl + Me_3SiOH$

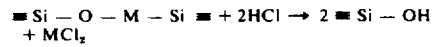

≡Si — O — M — Si≡ + 2HCl → 2 ≡Si — OH + MCl$_2$

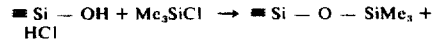

≡Si — OH + Me$_3$SiCl → ≡Si — O — SiMe$_3$ + HCl

M: Alkaline earth metal

The thus produced trimethylpolysilicate was divided into soluble and insoluble silicates with an excess of hexamethyldisiloxane. After the excess of hexamethyldisiloxane was distilled off, the residue was distilled at 160° -180°C and a pressure of 17 mm Hg. In this way, the soluble silicate could be further divided into volatile and nonvolatile portions. These substances were analyzed by gas chromatography.

The analysis of the magnesium aluminosilicate by the technique of simultaneous acid leaching and trimethylsilyl end-blocking gave the following silicate structrue distribution.

Table 2

|  | Orthosilicate (%) | Disilicate (%) | Soluble polysilicate (%) | Insoluble polysilicate (%) |
|---|---|---|---|---|
| Example 1 of this invention | 0.61 | 0.04 | 3.25 | 96.1 |
| Example 2 of this invention | 0.40 | 0.07 | 2.13 | 97.4 |
| U.S. Patent 2,970,889 | 29.7 | 3.8 | 60.7 | 5.8 |
| U.S. Patent 3,032,394 | 32.6 | 3.3 | 64.1 | 0 |
| Japanese Patent Publication No. 7719/67 | 30.9 | 0.4 | 65.4 | 3.3 |
| Japanese Patent Publication No. 618/59 | 37.8 | 6.8 | 55.4 | 0 |

As determined by this analytical method, magnesium aluminosilicate obtained by the process of this invention has the following silicate structure distribution:

| Orthosilicate | up to 0.9% |
| Disilicate | up to 0.1% |
| Soluble polysilicate | 2.0 – 3.5% |
| Insoluble polysilicate | 95.5 – 98.0% |

This distribution is affected by the temperature, the concentration of sodium silicate and the presence of a neutral salt in the partial neutralization of the starting sodium silicate and is finally determined by a molar ratio of $SiO_2$ to $Na_2O$.

On the other hand, in magnesium aluminosilicate obtained by prior art processes, the total amount of orthosilicate, disilicate and soluble polysilicate amounts to more than 90%. The degree of polymerization of the insoluble silicate can be determined from a ratio of silicon to organic substances bonded therewith obtained by elementary analyses.

The results of animal tests show that all of orthosilicate and disilicate and part of soluble polysilicate are absorbed through the wall of the stomach and the intestinal tracts. Magnesium aluminosilicate obtained by the process of this invention contains a very small amount of soluble polysilicate which corresponds to 1/20 to 1/40 of that of the magnesium aluminosilicate of U.S. Pat. Nos. 2,970,889 or 3,032,394.

Also, when magnesium aluminosilicate is simply decomposed by an acid such as hydrochloric acid or sulfuric acid, it is divided into two fractions. One consists of acid-soluble monomer and low grade polymeric silicic acids such as dimer or low grade polymeric ladder-shaped siloxane. The other consists of acid-insoluble high grade polymeric silicic acids. The analysis is carried out as follows:

A sample of magnesium aluminosilicate is decomposed by excess of 0.5 N hydrochloric acid, and the reaction mixture is then filtered through a filter paper for quantitative analysis. To a definite amount of the filtrate, concentrated hydrochloric acid is added, and the mixture is evaporated to dryness. Silica in the residue is determined as soluble silicic acid by gravimetric analysis with hydrofluoric acid.

The experimental results obtained by this method are as follows:

Table 3

|  | Soluble silica (%) | Insoluble silica (%) |
|---|---|---|
| Example 1 of this invention | 2.54 | 97.46 |
| Example 2 of this invention | 4.76 | 95.24 |
| U.S. Patent 2,970,889 | 93.65 | 6.35 |
| U.S. Patent 3,032,394 | 97.89 | 2.11 |
| Japanese Patent Publication No. 7719/67 | 95.31 | 4.69 |
| Japanese Patent Publication No. 618/59 | 99.08 | 0.92 |

Even by such a simple test, it is obvious that magnesium aluminosilicate obtained by the process of this invention is not only different in properties but also completely different in structure from magnesium aluminosilicate obtained by prior art processes.

The following examples will serve to illustrate the practice of the invention in more detail.

EXAMPLE 1

In 1,800 liters of water were dissolved 380 kg of sodium silicate of the grade No. 3 specified in JIS (molar ratio of $SiO_2$ to $Na_2O = 3.2 : 1$; $SiO_2$ content = 27%) and 45 kg of sodium sulfate. To the solution heated to 40°C was slowly added with vigorous stirring 370 liters of a 10% sulfuric acid solution. The pH of the mixture was 10.6. After the addition of the sulfuric acid solution, the mixture was aged for 1 hour and then mixed with a solution of 540 kg of sodium aluminate (molar ratio of $Na_2O$ to $Al_2O_3 = 1.72 : 1$; $Al_2O_3$ content = 19.0%) diluted with 1,050 liters of water in about 1 hour. A solution of 204 kg of magnesium chloride for food additive (MgO content = 19.8%) in 660 liters of water was further added and the mixture was stirred for 1 hour. Final pH was 12.3. According to the conventional method, the reaction product was washed with about 400 times the weight of the product of water to remove impurities, filtered and spraydried at an entering air temperature of 200° to 215°C. Yield was 360 kg. The analytical values of the dried product were as follows:

| $Al_2O_3$ | 29.2% |
| MgO | 11.5% |
| $SiO_2$ | 29.6% |
| Ignition loss | 27.1% |
| Acid consuming capacity | 208 ml/g |
| Fuchs' durability | 63 min. |

The thus obtained magnesium aluminosilicate was treated with artificial gastric juice at 37°C for 1 hour and then treated with artificial intestinal juice at 37°C for 5 hours. Thereafter, when filtered through filter paper for quantitative analysis, an amount of silicic acid contained in the filtrate was found to be 0.84% of the weight of the product.

EXAMPLE 2

To a solution of 220 kg of sodium silicate of the grade No. 3 specified in JIS (molar ratio of $SiO_2$ to $Na_2O = 3.2 : 1$; $SiO_2$ content = 27.0%) diluted with 900 liters of water, was gradually added 200 liters of a 10% sulfuric acid solution at 55°C with vigorous stirring. The mixture was aged for about 1 hour. The pH of the mixture was 11.2. Then, a sodium aluminate solution produced by adding a solution of 400 kg of sodium hydroxide in 1,200 liters of water to a solution of 593 kg of aluminum sulfate of the grade No. 1 specified in JIS ($Al_2O_3$ content = 17.2%) in 2,000 liters of water was added in about one hour and a solution of 407 kg of magnesium chloride for food additive (MgO content = 19.8%) in 900 liters of water was added. The mixture was stirred for 1 hour. Final pH was 10.8. According to the conventional method, the reaction product was washed with about 400 times the weight of the product of water to remove impurities, filtered and spray-dried at an entering air temperature of 200° to 215°C. Yield was 383 kg. The analytical values of the dried product were as follows:

| | |
|---|---|
| $Al_2O_3$ | 26.2% |
| MgO | 20.8% |
| $SiO_2$ | 15.6% |
| Ignition loss | 35.8% |
| Acid consuming capacity | 251 mg/g |
| Fuchs' durability | 75 min. |

The thus obtained magnesium aluminosilicate was administered to a 6 month-old beagle dog weighing 9.3 kg twice a day in an amount of 4.65 g of $SiO_2$ per day by oral intubation and an amount of silicic acid in urine was determined. The results obtained are shown in the following table:

Table 4

| | Before-administration | Days after administration | | | | | | |
|---|---|---|---|---|---|---|---|---|
| | | 1 | 2 | 3 | 4 | 5 | 6 | 7 |
| Amount of silicic acid excreted (mg/day) | 43.9 | 37.7 | 48.2 | 39.3 | 32.3 | 51.8 | 43.3 | 49.4 |

What is claimed is:

1. A process for the manufacture of magnesium aluminosilicate which comprises reacting polymeric sodium silicate, partially neutralized to the extent that the molar ratio of $SiO_2:Na_2O$ is 8–20:1 and having a siloxane structure of a silicic acid with a polymerization degree of $10^2$ to $10^4$, in an aqueous medium with sodium aluminate in an atomic ratio of Al to Si of 1 – 2 : 1 and then reacting the reaction product in an aqueous medium with a water soluble magnesium salt in an atomic ratio of Mg to Al of 0.5– 1:1.

2. A process according to claim 1, wherein said polymeric sodium silicate has a siloxane structure of a polymerization degree of $4.5 – 5.0 \times 10^3$.

3. A process according to claim 1, wherein said polymeric sodium silicate is produced by adding a mineral acid to an aqueous solution of sodium silicate having a molar ratio of $SiO_2$ to $Na_2O$ of 1.0 – 3.3 : 1 at a temperature of 20° – 80°C to partially neutralize the sodium silicate up to a molar ratio of $SiO_2$ to $Na_2O$ of 8 – 20 : 1.

4. A process according to claim 3, wherein the partial neutralization of said sodium silicate is carried out in the presence of sodium chloride or sodium sulfate.

5. Magnesium aluminosilicate having the following silicate structure distribution as determined by Lenz's technique of simultaneous acid leaching and trimethylsilyl end-blocking:

| | |
|---|---|
| Orthosilicate | 0 – 0.9% |
| Disilicate | 0 – 0.1% |
| Soluble polysilicate | 2.0 – 3.5% |
| Insoluble polysilicate | 95.5–98.0%. |

6. Magnesium aluminosilicate produced by a process according to claim 1.

7. The process of claim 1 wherein said water soluble magnesium salt is magnesium chloride.

* * * * *